United States Patent [19]

Brown

[11] Patent Number: 4,793,701
[45] Date of Patent: Dec. 27, 1988

[54] AUXILIARY REAR VIEW MIRROR

[76] Inventor: Don E. Brown, Rte. 3, Box 235A, Clinton, Mo. 64735

[21] Appl. No.: 75,944

[22] Filed: Jul. 21, 1987

[51] Int. Cl.⁴ .............................................. G02B 7/18
[52] U.S. Cl. .................................... 350/632; 248/467; 350/636
[58] Field of Search ................ 248/467, 160; 350/616, 350/632, 634, 636, 631

[56] References Cited

U.S. PATENT DOCUMENTS

| | | | |
|---|---|---|---|
| 2,764,913 | 10/1956 | Green | 350/616 |
| 2,940,361 | 6/1960 | Francisco | 248/160 |
| 3,131,250 | 4/1964 | Ely | 248/467 |
| 3,424,424 | 1/1969 | Kelley | 350/616 |
| 4,200,359 | 4/1980 | Lawson | 248/467 |
| 4,208,104 | 6/1980 | Peterson | 350/616 |
| 4,311,363 | 1/1982 | Marsalka et al. | 248/467 |
| 4,605,292 | 8/1986 | McIntosh | 248/467 |

OTHER PUBLICATIONS

"Stress and Strain," *McGraw-Hill Encyclopedia of Science and Technology*, 5th edition, New York, 1982, pp. 216-217.
Polentz, *Engineering Fundamentals for Professional Engineers' Examinations*, McGraw-Hill Book Company, New York, 1979, pp. 225-227.

*Primary Examiner*—John K. Corbin
*Assistant Examiner*—Martin Lerner
*Attorney, Agent, or Firm*—Hovey, Williams, Timmons & Collins

[57] ABSTRACT

An auxiliary mirror assembly is comprised of an auxiliary mirror, a coupling device affixed to a back section of a conventional, existing rear view mirror, and an elongated, rod-like deformable member interconnecting the auxiliary member and the coupling device. The deformable member may be shaped by finger pressure for movement of the auxiliary mirror relative to the conventional mirror about any one of a number of vertical and horizontal axes in order to shift the auxiliary mirror toward a selected, inclined position to view children in the back seat or enhance observation of traffic to one side of the vehicle. Once deformed, the member is self-sustaining to retain the auxiliary mirror in the selected position although additional, subsequent one-hand movement of the auxiliary mirror is also possible. The coupling device includes an adhesive pad that is readily affixed to the forwardly facing, back section of the conventional mirror so that no portions of the opposite, reflective surface of the conventional mirror are obscured.

6 Claims, 1 Drawing Sheet

AUXILIARY REAR VIEW MIRROR

BACKGROUND OF THE INVENTION

1. Field of the Invention

This invention broadly relates to an auxiliary mirror which is connected to a conventional, interior rear view mirror of a vehicle and which may be adjusted to an inclined orientation relative to the rear view mirror for viewing, for example, small children in the rear seat. More particularly, the invention concerns an auxiliary mirror assembly which includes an elongated, rod-like member interconnecting the auxiliary mirror and the conventional mirror, wherein the member is deformable by hand about any one of three mutually perpendicular axes of rotation for facilitating positioning of the auxiliary mirror. A coupling device connecting the deformable, rod-like member to the conventional mirror includes an adhesive portion which faces in the same general direction as the reflective, viewing portion of the auxiliary mirror so that the coupling device may be affixed to the forwardly facing back section of the conventional mirror without obstruction of the reflective section on the opposite side of the same.

2. Description of the Prior Art

Parents of infants and relatively small children have long been faced with the problem of maintaining an observant watch over the children while driving. It is known that the rear seat represents a location that is safer for the transport of small children than does the front seat in a position next to the driver. In addition, the passenger side of the front seat may be occupied by others and the children are thus typically relegated to the back seat by default.

Unfortunately, it is also known that children oftentimes are not ideal passengers, and a fair amount of bothersome activities or mischiefmaking can be expected. While the driver is normally free to talk to young passengers, it is difficult to maintain constant surveillance over activities in the rear seat without losing sight of the road.

Adults with very young children and infants often utilize a child seat or carrier that is connected by seat belts to the adult-sized rear seat of the vehicle. In turn, the small child is held in the seat or carrier by straps of the same. Such straps, while being useful for restraining movement of the child in the event of a collision, do not avoid the necessity of intermittently observing the child to insure that his or her well-being and safety is not impaired by other factors.

As can be appreciated, however, the driver of a moving vehicle is also under an obligation to carefully watch the road at all times and thus the common practice of turning the head to steal glances at the children in the rear seat is dangerous and should be avoided. Of course, other adults or larger children may be available as passengers for assistance in caring for the small children, but in many circumstances the driver may be alone in the vehicle with one or more small children in the rear seat.

To this end, a number of auxiliary mirror assemblies have been proposed in the past for connection to the conventional, existing rear view mirror of the vehicle. The auxiliary mirrors, which are often smaller than conventional mirrors, are oriented at an inclination relative to the latter so that the line of sight reflected in the auxiliary mirror is in a different direction than the line of reflected vision provided by the conventional mirror, in order that passengers in the rear seat may be observed. However, prior art auxiliary mirror assemblies have been unsatisfactory for one reason or another.

As an example, auxiliary mirror assemblies which are illustrated and described in U.S. Pat. Nos. 3,048,084, 3,790,117, 3,954,328, and 4,598,982 are provided with a relatively complex, clamp-like mounting device for securing the auxiliary mirror to the conventional, existing rear view mirror. These clamp-like mounting devices require a certain amount of time for initial connection of the auxiliary mirror assembly to the existing mirror and in some cases require tools to tighten fasteners that may become loosened over a period of time. Additionally, clamp-like mounting devices of this type may not be adaptable for connection with rear view mirrors having certain, somewhat unconventional configurations.

Other auxiliary mirror units are described in U.S. Pat. Nos. 4,223,983, 4,200,359, 4,311,363, and 4,526,446 and are comprised of a relatively small auxiliary mirror having a back surface which is connected to an adhesive material for stick-on attachment directly to the reflective surface of the larger, existing mirror. However, auxiliary mirrors which are directly connected to the reflective face of the existing mirror necessarily obscure a portion of the reflective surface of the same, thereby undesirably diminishing the field of view of the driver and establishing blind spots.

In U.S. Pat. No 2,636,419 an auxiliary mirror assembly is shown wherein a generally rectangular backing plate is provided for mounting the auxiliary mirror to the existing, conventional rear view mirror. The backing plate of the assembly illustrated in U.S. Pat. No. 2,636,419 is comprised of mild steel material and can be bent about a single axis parallel to the adjacent sides of both mirrors to provide a field of view toward traffic lanes on the right side of the car. However, the flat configuration of the backing plate shown in this reference prevents movement of the auxiliary mirror relative to the existing mirror about other axes such as horizontal axes as may be necessary for viewing children in the rear seat when the main or conventional mirror is positioned to reflect traffic behind the vehicle.

My attention has also been directed toward U.S. Pat. Nos. 1,114,559, 4,019,812, and 4,345,819, all of which describe other types of auxiliary mirror assemblies. For one reason or another, however, these devices are also not entirely satisfactory.

Furthermore, many of the known auxiliary mirror assemblies are provided with an adjustment mechanism for varying the angle of the auxiliary mirror relative to the conventional or main mirror, but such adjustment mechanisms often involve the use of thumbscrews, adjusting bolts or the like which are difficult to use especially when the vehicle is in motion. The nature of most adjustment mechanisms also requires that the driver hold the auxiliary mirror in the desired orientation with one hand while loosening or tightening the mechanism with the remaining hand. Obviously, such mechanisms cannot be adjusted by the driver while the vehicle is in motion even though such minor adjustments may often be necessary to retain the children in the reflected field of vision of the auxiliary mirror.

SUMMARY OF THE INVENTION

The present invention overcomes the disadvantages noted above with regard to prior art devices by provision of an assembly which includes an auxiliary mirror that may be readily adjusted by one hand while the car is in motion and about either horizontal or vertical axes to any one of a number of inclined positions relative to the conventional rear view mirror. Moreover, a mounting device coupling the assembly to the conventional rear view mirror includes an adhesive pad which is affixed to the back or forwardly facing section of the conventional mirror in order to avoid obscuring any regions of the reflective face of the conventional mirror.

In more detail, the auxiliary mirror assembly of my present invention includes an elongated, rod-like member which interconnects the existing mirror and the auxiliary mirror for carrying the latter. The rod-like member is deformable by finger pressure for movement of the auxiliary mirror relative to the conventional mirror about any one of three mutually perpendicular axes of rotation. As a consequence, the auxiliary mirror can be shifted to any one of a number of different orientations as may be desired for viewing different regions of the rear seat or, alternatively, observing traffic through side windows in a direction different than the field of view provided by the conventional mirror. The material comprising the member is sufficiently stiff to ensure that the member is self-sustaining subsequent to deformation in order to securely retain the auxiliary mirror in the selected orientation even though the vehicle may be shaken by bumps in the roadway during travel.

In accordance with the principles of my present invention, the use of a rod-like deformable member to interconnect an auxiliary mirror and an existing, conventional rear view mirror enables the user, as one example, to bend the member toward a generally S-shaped configuration with the middle region of the member extending in a somewhat horizontal direction. In such a configuration, the member can subsequently be deformed to shift the auxiliary member up or down without varying the rotative position of the auxiliary mirror with respect to a vertical axis. Moreover, the auxiliary mirror can be readily moved as may be desired about the aforementioned vertical axis, as well as a number of horizontal axes so that full, multidirectional movement of the auxiliary mirror can be instantly effected without the necessity for using two hands to, for example, adjust thumbscrews or the like.

DETAILED DESCRIPTION OF THE DRAWINGS

Figure 1:
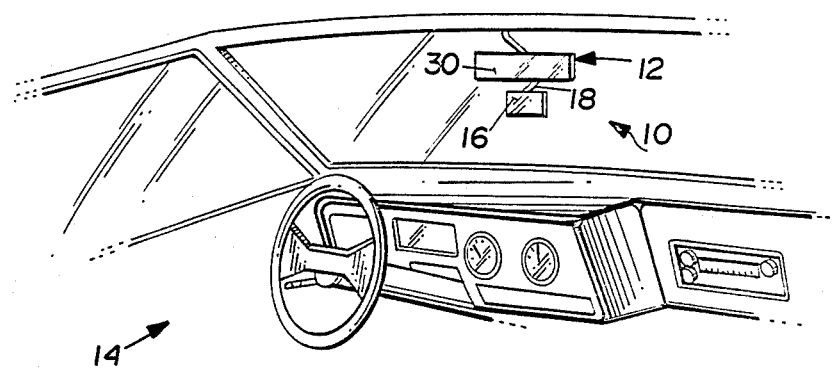
FIG. 1 is a perspective view of an auxiliary mirror assembly constructed in accordance with my present invention and showing the assembly as mounted to the existing, conventional or main mirror of a passenger vehicle.

An auxiliary mirror assembly in accordance with the principles of my present invention is shown in FIGS. 1-4 and is designated broadly by the numeral 10. The assembly 10 is connected to a main or conventional rear view mirror 12 of a vehicle 14, the interior compartment of which is illustrated in FIG. 1.

Figure 2:
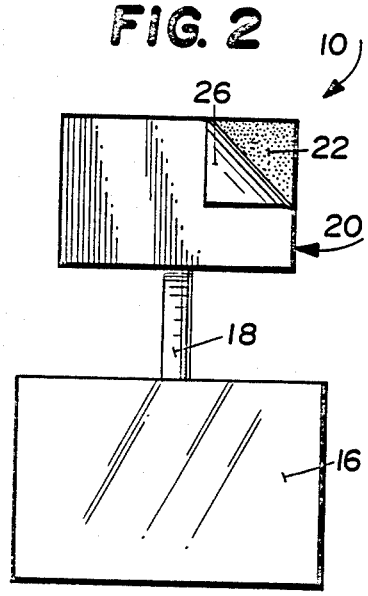
FIG. 2 is an enlarged, front elevational view of the assembly depicted in FIG. 1 before installation in the vehicle, with a portion of a flexible, protective membrane peeled back to reveal an adhesive pad for securing the assembly to the back of the conventional mirror.
Figure 3:
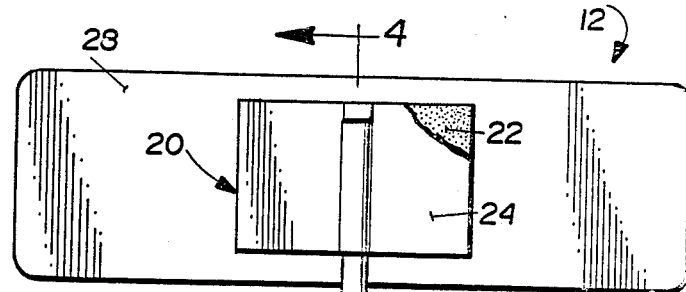
FIG. 3 is an enlarged, rear elevational view of the assembly shown in FIG. 1 with parts broken away in section to reveal the construction of the auxiliary mirror and the coupling device for mounting the mirror to the conventional rear view mirror.

More specifically, the assembly 10 comprises an auxiliary mirror 16, an elongated, rodlike member 18 connected to the auxiliary mirror 16, and a coupling device 20 interconnecting the member 18 and the conventional mirror 12. The coupling device 20, as illustrated in FIGS. 2-4, includes a double-faced adhesive pad 22, one face of which is affixed to an aluminum plate 24 which has an overall profile identical to the configuration of the perimeter of the adhesive pad 22, but also which is formed to capture the upper end of the member 18, as can be best appreciated by reference to FIGS. 3 and 4.

The opposite face of adhesive pad 22, remote from plate 24, is initially covered before installation of the assembly 10 by thin, pliable, paper-like membrane 26 in order to protect dirt and the like from accidentally contacting the adhesive face of pad 22. During installation, however, the membrane 26 is peeled back in the manner shown in FIG. 2 and removed from the pad 22, and the pad 22 is then mounted directly to a back section 28 (FIGS. 3 and 4) of the conventional, existing mirror 12.

Figure 4:
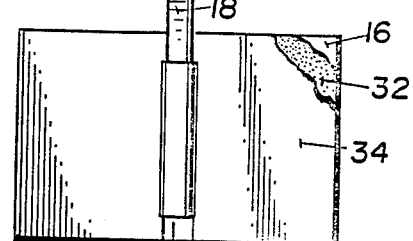
FIG. 4 is an enlarged, fragmentary, side cross-sectional view taken along line 4-4 of FIG. 3 and illustrating one of many possible configurations of a deformable rod-like member interconnecting the coupling device and the auxiliary mirror.
Figure 4:
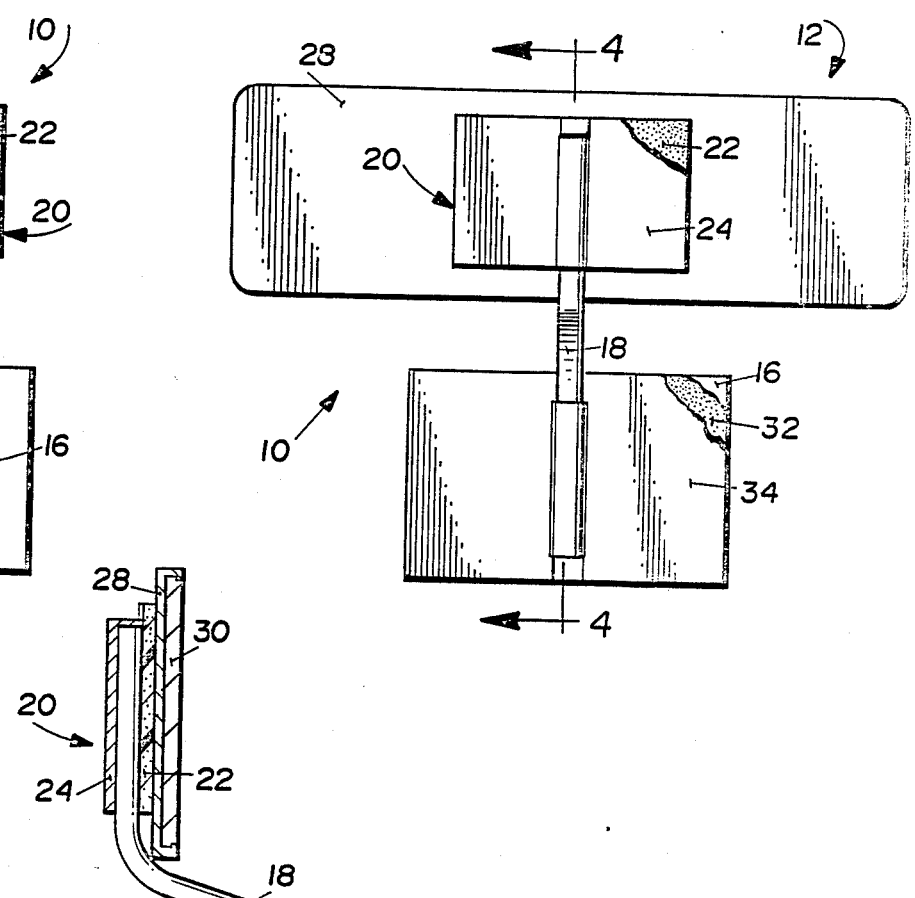
Figure 4:
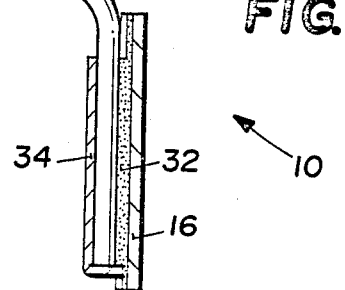

The back section 28, as is typical with conventional mirrors such as mirror 12, is formed as part of a synthetic resinous housing which surrounds the back and sides of mirrored glass that presents a reflective section 30 as is shown in FIGS. 1 and 4. The reflective section 30 faces rearwardly of the vehicle 14, while the back section 28 is disposed on an opposite side of the conventional mirror 12 and faces forwardly of the vehicle 14 with respect to the fore-and-aft axis of the latter.

The rod-like member 18 interconnecting the conventional mirror 12 and auxiliary mirror 16 is hand deformable by finger pressure for movement of the auxiliary mirror 16 relative to the conventional mirror 12 and the coupling device 20 about any one of a number vertical and horizontal axes in order to shift the auxiliary mirror 16 toward a selected, inclined position relative to the rear view mirror 12. The deformable member 18, as shown in FIGS. 1-4, has a circular cross section although other configurations are, of course, possible.

Once the member 18 is deformed to bring the auxiliary mirror 16 toward a desired orientation, the inherent memory of the material comprising the rod-like member 18 self-sustains the latter in its deformed configuration in order to substantially retain the auxiliary mirror 16 in the selected position.

Finally, the coupling device 20 of the assembly 10 includes a plate-like element 32 (FIGS. 3 and 4) which has a perimeter substantially identical in configuration to the perimeter of auxiliary mirror 16. A middle region of the plate-like element 32 is shaped to capture the lower end of the member 18, and in turn the element 32 is secured to the non-reflective, back face of the auxiliary mirror 16 by means of adhesive 34, as detected in FIG. 4.

The nature of the deformable, rod-like member 18 permits the auxiliary mirror 18 to be moved about any three mutually perpendicular axes of rotation relative to the rear view mirror 12. Moreover, when the member 18 is formed to the S-shaped configuration depicted in FIG. 4, a middle region of the member 18 accomodates vertical movement of the mirror 16 while also permitting side-to-side lateral adjustment of the same. Thus, the auxiliary mirror 16 is shiftable to virtually any orientation as desired to view various regions of the rear seat of the vehicle 14, and also may be positioned to function as a second rear view mirror for observing traffic conditions outside of the vehicle 14 and to one side of the field of view provided by the conventional mirror 12.

The auxiliary mirror 16 may readily be shifted by hand by grasping the same to bend the deformable member 18 as long as the adjustable mounting device supporting the conventional mirror 12 is relatively stiff. However, should mirror 12 move when bending the rod-like member 18, then the fingers of one hand can engage the mirror 12 while the other fingers or palm contact the auxiliary mirror 16 in order to change the relative orientation of the mirrors 12, 16 as may be desired when the use of two hands is not feasible.

While the foregoing represents a description of a currently preferred embodiment of my invention, it is recognized that those skilled in the art may make various additions or modifications to the particular structure described and illustrated without departing from the gist and essence of my contribution to the art. Therefore, it is to be understood that the invention should be limited only by a fair scope of the claims which follow, along with their mechanical equivalents thereof.

What I claim is:

1. For use with a rear view mirror of a vehicle, an auxiliary mirror assembly comprising:

an auxiliary mirror;

a coupling device for fixed connection with said rear view mirror; and an elongated, rod-like member interconnecting said coupling device and said auxiliary mirror for supporting the latter, said member being bendable by hand for movement of said auxiliary mirror relative to said coupling device about any one of a number of vertical and horizontal axes in order to shift said auxiliary mirror toward a selected, inclined position relative to said rear view mirror, said member being self-sustaining subsequent to bending in any one of a number of configurations to substantially retain said auxiliary mirror in said selected position, said member being axially bendable by hand from a configuration having a straight longitudinal axis to configurations having a curved longitudinal axis.

2. The invention as set forth in claim 1, wherein said member is hand deformable for movement of said auxiliary mirror relative to said rear view mirror about any one of three mutually perpendicular axes of rotation.

3. The invention as set forth in claim 1, wherein coupling device comprises an adhesive portion for contact with said rear view mirror.

4. The invention as set forth in claim 3, wherein said rear view mirror presents a back section facing forwardly of said vehicle and a reflective section facing rearwardly of said vehicle, wherein said auxiliary mirror includes a userfacing reflective surface portion, and wherein said adhesive portion of said coupling device faces in the same general direction as said reflective surface portion of said auxiliary mirror and said reflective section of said rear view mirror for enabling said adhesive portion to be fixed to said back section of said rear view mirror.

5. The invention as set forth in claim 4, wherein said coupling device at least initially includes a flexible membrane detachably connected to said adhesive portion for protecting the latter prior to installation and connection with said back section of said rear view mirror.

6. The invention as set forth in claim 1, wherein said auxiliary mirror presents an overall configuration of a size smaller than said rear view mirror.

* * * * *